United States Patent Office 3,131,224
Patented Apr. 28, 1964

3,131,224
PREPARATION OF POLYMERS
CONTAINING BORON
Gaetano F. D'Alelio, South Bend, Ind., assignor, by direct and mesne assignments, to Dal Mon Research Co., Cleveland, Ohio, a corporation of Delaware
No Drawing. Filed June 30, 1958, Ser. No. 745,288
13 Claims. (Cl. 260—606.5)

This invention relates to polymers containing boron. Because of the high energy content of such compounds, boron compounds having boron to carbon bonds, such as alkyl boranes, have been suggested as fuel compositions. However, because of their tendency to ignite spontaneouslly upon exposure to air, and the highly reactive nature of these compounds, the use of alkyl boranes involves considerable danger and necessitates various precautionary steps. Moreover, since they are liquids, their use as propellant fuels for rockets, missiles, and related devices, has the drawbacks common to liquid fuels in that complicated containers and pumping devices are required, and the sloshing effect of the liquids in their containers causes shifting of weight which adversely affects directional control.

In accordance with the present invention, polymeric borane compounds have been discovered which have more easily controlled flammability and reactivity while still retaining high energy content. Such polymeric materials can be made in the solid state and thereby have the inherent advantages of solid fuels used for propelling purposes.

The polymeric compositions of this invention are prepared from boron hydrides, or the boranes, including the various polyboranes, such as diborane, triborane, tetraborane, pentaborane, hexaborane, decaborane, etc., and the mono- and poly-substituted boranes in which the substituents are hydrocarbon groups (including those having substituents thereon which are nonreactive to boranes), by reaction with polyalkenyl ether compounds (including those having substituents thereon which are nonreactive to boranes), having a plurality of ethylenically unsaturated groups therein, hereinafter referred to as ethylenic groups.

Such compositions can be made in liquid or solid form, and can be converted to infusible forms. These polymeric compositions are useful as high energy fuels, either as a supplement or as the main component, and are particularly useful in the solid form for such purposes. Particularly useful infusible solid fuels can also be made by incorporating a solid or liquid oxidizing agent into the polymeric compositions of this invention while they are in a liquid or thermoplastic state, and then converting the polymer to a crosslinked, infusible condition.

Typical boranes and unsubstituted boranes that can be used in the practice of this invention include, but are not limited to, the following: diborane, triborane, tetraborane, pentaborane, hexaborane, decaborane, trimethyl borane, triethyl borane, tripropyl borane, tributyl borane, triamyl borane, trihexyl borane, tri-octyl borane, tri-decyl borane, tri-tetradecyl borane, tri-cyclohexyl borane, triphenyl borane, triphenethyl borane, monomethyl diborane, symmetrical dimethyl diborane, unsymmetrical dimethyl borane, trimethyl diborane, tetramethyl diborane, monoethyl diborane, symmetrical diethyl diborane, unsymmetrical diethyl diborane, triethyl diborane, tetraethyl diborane, monopropyl diborane, symmetrical dipropyl diborane, unsymmetrical dipropyl diborane, tripropyl diborane, tetrapropyl diborane, trimethyl triborane, tetramethyl triborane, hexamethyl triborane, tetraethyl tetraborane, hexaethyl tetraborane, etc.

Borane, or borine ($BH_3$) is unstable as such and dimerizes to diborane which reacts as two molecules of borane. Therefore, diborane is generally the reagent actually used. However, it is convenient to consider this as a reaction of borane, as indicated in various reactions described herein. Where reactions of mono-substituted boranes are indicated, it is generally also possible to use polyboranes having one such substituent on each boron atom, such as symmetrical dimethyl diborane, etc. Likewise, in reactions calling for disubstituted boranes, it is also possible to use polyboranes having two such substituents on each boron atom, such as tetramethyl diborane, etc.

Because of the tendency of various mono- and di-substituted boranes, and of various substituted diboranes and other polyboranes to disproportionate and form trisubstituted boranes and diborane, it is generally desirable to keep such reagents at low temperatures until they are to be used. In some cases, where particularly active reagents are being used, it may be desirable to mix the reactants at low temperature and allow the temperature to rise gradually. In certain cases, it is desirable to use a diluent or solvent to facilitate control of temperature and concentration. Generally, the reaction can be controlled by adding the borane gradually while maintaining the other reactant at the desired reaction temperature. It is generally advantageous to add the borane to the polyalkenyl compound either as such, or in solution.

The polymeric products of this invention range from viscous oils to solid thermoplastic or thermoset resins. Depending upon the particular starting materials, modifiers, and polymerization conditions, the polymers range in molecular weight from about 200 to 100,000 and higher.

It is not intended that the invention be limited to any particular theory, or to any particular formula. It is believed, however, that when a polyunsaturated compound is used having the formula $$R_2C=CR—Z—CR=CR_2$$

polymers obtained by the practice of this invention can be represented by the formula:

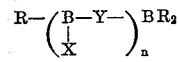

wherein X is R or Y, Z is an ether-containing radical as defined below, and Y is a polyvalent radical derived from the polyalkenyl compounds and having as many valences as there are boron atoms attached thereto. When derived from dialkenyl compounds, Y is a divalent radical. When derived from trialkenyl compounds, Y can also be a trivalent radical.

While it is believed that each boron atom becomes attached to one of the carbon atoms of an ethylenic group, it is also possible that the boron migrates, during or after the reaction between the borane compound and the polyalkenyl compound, and becomes attached to any other carbon atom of the polyalkenyl compound that will give a more stable derivative. Thus, the boron may actually be attached to one of the R groups or to Z. For that reason Y is represented as a divalent radical having the formula $$C_2R_3H—Z—C_2R_3H$$

without pinpointing the carbon atoms to which the boron is actually attached.

Accordingly, the polymeric products are represented by the formula

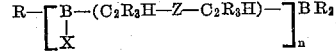

When the boron becomes attached and does not migrate from the ethylenic group, the polymeric product can probably be represented by the following formula

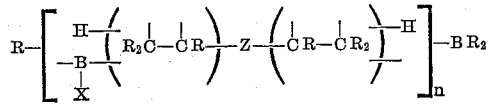

or generally can be simplified, particularly where the ethylenic groups are vinyl or vinylidene groups, to

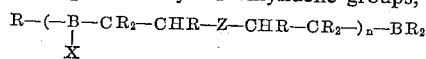

In the above formulas, R represents hydrogen, or a hydrocarbon group; $n$ is an integer greater than 1, preferably greater than 4; and Z represents —O— or a divalent group predominantly hydrocarbon, said divalent group having an ether linkage between the valences. The hydrocarbon nucleus of R and hydrocarbon portions of Z can have attached thereto substituents which are nonreactive toward the borane compound being used. However, additional alkenoxy groups can also be attached to R and Z.

It is also believed that, when infusible polymers are obtained by the practice of this invention, the crosslinkages between linear polymer chains, such as represented above, can generally be represented by replacing an R group from a boron atom in two different polymer molecules and substituting for two such R groups, the divalent radical —$(C_2R_3H—Z—C_2R_3H)$— or
—$CR_2—CHR—Z—CHR—CR_2$—

When the borane has no more than one hydrocarbon group attached to each boron atom, such as borane, diborane, triborane, methyl borane, ethyl borane, propyl borane, symmetrical dimethyl diborane, symmetrical diethyl diborane, 1,2,3-trimethyl triborane, etc., and a polyunsaturated compound is used which has two vinyl groups, it is believed that the polymerization proceeds linearly, at least initially, as follows:

$RBH_2 + CH_2=CH—Z—CH=CH_2 \longrightarrow$

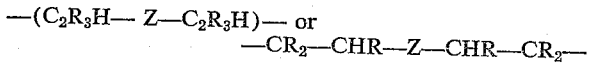

When a borane is used which has two or more hydrocarbon groups on each boron atom or a linear polymer, such as above, is used in which the R on the boron is a hydrocarbon group, the hydrocarbon groups can be displaced by the dialkenyl compound and the R groups liberated as the corresponding olefin. For example, when the three R's on each boron atom are hydrocarbon groups, the polymer is believed to proceed linearly, at least initially, as follows:

$BR_3 + R_2C=CR—Z—CR=CR_2 \longrightarrow$

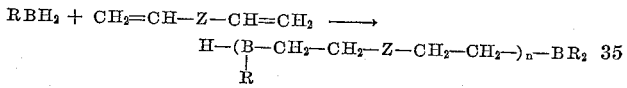

When crosslinking is effected it is believed that the crosslinked portion of the polymer can be represented as:

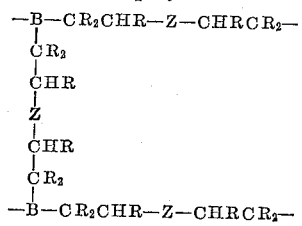

Various modifications of polymeric materials can be made according to the practice of this invention by adjusting the proportions of reactants and the conditions under which the materials are made to react. For example, control of the proportions of reactants enables control over the amount of crosslinking and the amount of polymer formation before crosslinking is effected. Thus, by increasing the proportion of the dialkenyl compound, a higher degree of conversion to polymer can be effected before crosslinking begins. Likewise, the higher the ratio of boron compound to polyalkenyl compound, the lower is the degree of conversion before crosslinking takes place. The selectivity, type of reaction, and product, can be controlled somewhat by selecting appropriate boron compounds, concentrations thereof, the polyalkenyl compound, and also by the use of certain amounts of monoalkenyl compounds. For example, since the hydrogen in borane compounds is more easily replaced than alkyl groups, it is possible thereby to control somewhat the type and extent of reaction.

On the basis that functionality of the borane is 3 and that of a dialkenyl compound is equivalent to 2, since each unsaturated group acts as a monoalkylating agent, a rough estimate of the extent of reaction can be calculated from the functionality equation $P=2/F$ where P equals the extent of reaction and F is the functionality of the system. Approximate values derived from such calculations are shown in the following table:

| Boron Compound (Moles) | Dialkenyl Compound (Moles) | Approximate extent of reaction before crosslinking, percent |
|---|---|---|
| 1 | 4 | 91 |
| 1 | 3 | 89 |
| 1 | 2 | 86 |
| 1 | 1 | 80 |
| 3 | 2 | 77 |
| 2 | 1 | 75 |
| 3 | 1 | 73 |
| 4 | 1 | 72 |

As indicated by these calculations, the higher the mole ratio of the boron compound to the dialkenyl compound, the sooner the crosslinking is likely to occur as the reaction proceeds. When a mole of trialkenyl compound, such as $C_3H_5(OCH_2CH=CH_2)_3$, or $C_6H_3(OCH=CH_2)_3$, is reacted with a mole of boron compound $BR_3$, the value for P approaches 67%, whereas when a tetra-alkenyl compound such as $C(CH_2OCH_2CH=CH_2)_4$ is used, the gellation value P approximates 57%.

When it is desired to prepare a thermoplastic resin according to the practice of this invention, either for use as such or for mixture with other materials, or intermediate treatment prior to conversion to an infusible resin, it is advantageous to use a borane having one hydrocarbon group per boron atom. However, thermoplastic resins can also be prepared by controlling the reaction conditions when unsubstituted boranes are used, or when boranes are used having more than one hydrocarbon substituent per boron atom.

The preparation of thermoplastic resins can also be facilitated by the use of monoalkenyl compounds which will replace the hydrogen on borane and thereby retard crosslinking until desired, at which time higher temperatures can be used to replace such alkyl groups with the polyalkenyl compound. Thus, it may be seen than when 1 mole of a borane, e.g. triethyl borane is reacted with 1 mole of a dialkenyl ether compound, e.g. divinyloxy benzene, and 1 mole of a monoalkenyl compound, which can be a hydrocarbon or ether compound, a high molecular weight thermoplastic boron-containing polymer is obtainable, as illustrated by the following equation, which shows the repeating units in the polymer, e.g.

$B(C_2H_5)_3 + CH_2=CHOC_6H_5 + CH_2=CHOC_6H_4OCH=CH_2 \longrightarrow$

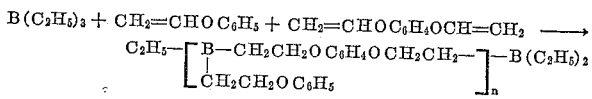

By further heating and by alkylation exchange, this polymer can be converted to a crosslinked polymer, for example by exchange of additional divinyloxy benzene for phenoxyethyl groups, or by compounding or dispersing the polymer in excess divinyloxy benzene, and having the liberated vinyl phenyl ether copolymerize with the free vinyl groups of the divinyloxy benzene. Thus, if another mole of divinyloxy benzene is added to the polymer of the above structure, the crosslinked polymer can probably be represented, at least in part, by the following structure:

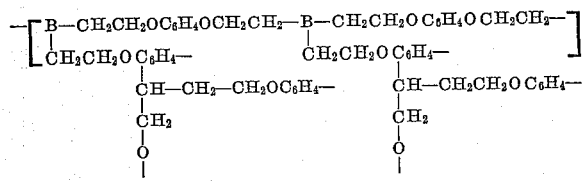

By the practice of this invention a wide range of boron-modified polymers can be made by varying the ratio of the boron compound to the polyalkenyl ether compound and thereafter effecting addition polymerization with monoalkenyl compounds, especially when the alkenyl compounds contain active polymerizable vinyl or vinylidene groups; for example, if one-half mole of $(BH_3)_2$, or one mole of $BR_3$, e.g. $B(C_2H_5)_3$ is reacted with three moles of an active dialkenyl ether compound, e.g. divinyloxy benzene, the dialkenyl compound will react as follows:

and

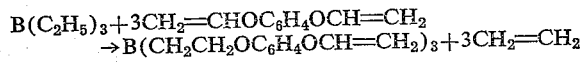

If the reaction is interrupted before gellation takes place (calculated here at about 89% conversion), and styrene, vinyl phenyl ether, or more divinyloxy benzene, or another polymerizable monomer is added, modified polymers containing various amounts of boron can be prepared with different degrees of crosslinkages and heat resistance. Also, before gellation, an oxidizing agent, particularly a solid oxidizing agent of the type indicated hereinafter, can be added to produce fuel compositions of self-sustaining combustion properties. Alternately, if the borane compound containing alkyl groups derived from active polymerizable olefins, such as styrene, is treated with a dialkenyl ether compound containing active polymerizable groups, the released olefin can copolymerize with the resulting reaction product. For example, a clear glass-type resin is obtained without by-product styrene being released when tristyryl borane is treated with divinyloxy benzene.

For the purposes of this invention, the ethylenic unsaturation need not be a terminal group, such as vinyl or vinylidine, and can be anywhere in the molecule of the ether compound. Aromatic unsaturation, such as is present in a benzene nucleus, is not regarded as ethylenic unsaturation for the purposes of this invention.

When it is desired to control the molecular weight of a linear polymer, or to put terminal hydrocarbon groups on a polymer chain, this can be accomplished by using a mono-olefin, such as ethylene, propylene, styrene, or an ether compound having only one ethylene group therein, together with a polyalkenyl ether compound as indicated above. This can also be done by using a tri-substituted borane, alone or together with an unsubstituted or mono-substituted borane.

In the addition of boranes to ethylenic groups, it is advantageous to catalyze the reaction by the use of an organic ether. However, in the practice of this invention the polyalkenyl ether compound itself acts as a catalyst to promote the addition. When it is desired to use additional catalysts, or to use solvents or diluents, diisopropyl ether, tetrahydrofurane, diglyme, etc., are particularly useful for such purpose as well as the borane derivatives which contain ether groups therein, including, but not limited to: mono-(beta methoxy-ethyl)-borane, bis-(beta methoxy-ethyl)-borane, tris-(beta methoxy-ethyl)-borane, mono-(beta ethoxy-ethyl)-borane, bis-(beta ethoxy-ethyl)-borane, tris-(beta ethoxy-ethyl)-borane, mono-(beta-methoxy-ethyl)dimethyl-borane, bis-(beta-ethoxy-ethyl)ethyl-borane, beta-(ethoxy-phenyl)-ethyl borane, beta-(ethoxy-cyclohexyl)-ethyl borane, etc. Such boron ether derivatives can be prepared simply by the addition of boranes to ethylenically unsaturated ethers, such as vinyl methyl ether, vinyl ethyl ether, vinyl butyl ether, vinyl propyl ether, vinyl amyl ether, vinylclclohexyl ether, vinyl phenyl ether, vinyl tolyl ether, isopropenyl methyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, etc. Such unsaturated ethers can also be added directly to the reaction mixture to serve as modifiers as well as catalysts.

When a high proportion of boron is desired in the ultimate product, it is preferred that the polyalkenyl ether compound be of relatively low molecular weight, generally not over 200 or 300. Typical polyalkenyl ether compounds that can be used in the practice of this invention include, but are not limited to, the following: divinyl ether, diallyl ether, vinyl allyl ether, propenyl vinyl ether, propenyl allyl ether, divinyl ether of resorcinol, divinyl ether of ethylene glycol, diisopropenyl ether, isopropenyl vinyl ether, isopropenyl allyl ether, isopropenyl butenyl ether, isopropenyl isoamylene ether, diallyl ether of resorcinol, diisobutenyl ether of hydroquinone, paravinyloxy styrene, para allyloxy styrene, triallyloxy benzene, tripropenyloxy benzene, etc.

Typical mono-alkenyl modifiers that can be used in the practice of this invention include, but are not limited to, the following: ethylene, propylene, butene-1, butene-2, hexene-1, hexene-2, t-butyl-ethylene, 2,4,4-trimethyl-1-pentene, 2,4,4-trimethyl-pentene-2, cyclopentene, cyclohexene, styrene, 1,1-diphenyl ethylene, vinyl cyclohexane, alpha-methyl-styrene, vinyl naphthalene, beta-methyl styrene, allyl benzene allyl cyclohexane, decene-1, decene-2, decene-3, decene-4, decene-5, dodecene-1, dodecene-2, tetradecene-1, hexadecene-1, cyclopentene, etc.

Monoalkenyl ether compounds that can also be used as modifiers include those listed above as suitable for the preparation of borane dervatives containing ether groups.

In cases where the reactants are gaseous, the reaction can advantageously be carried out by mixing the reactants at room temperature and then passing into an ether, such as diethyl ether, diisopropyl ether, tetrahydrofurane, diglyme, etc., maintained at the desired reaction temperature. The ether thereafter can be removed, for example, by evaporation etc., and, if desired, the product can be heated to increase its viscosity, or to convert it to infusibility.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric."

*Example I*

A mixture of three parts of tri-secondary-butyl borane, and two parts of divinyloxy benzene, is heated in an atmosphere of nitrogen at 50° C. When heating is started, the mixture is a clear solution but after about 20 minutes a precipitate starts to form. The heating is continued until the reaction mixture forms a solid cake and until no more butene is released from the reaction, which in this case takes less than 12 hours. The product is washed with heptane to extract traces of unconverted tributyl borane. The washed product is stable in air in contrast to the ordinary organoboranes which oxidize and burn in air. This product is ground with an equal weight of ammonium perchlorate. The resultant mixture when ignited and tested according to known tests for propellant thrust, shows excellent thrust properties.

*Example II*

A mixture of two parts of tri-secondary-butyl borane and ten parts of divinyloxy benzene, is heated in an atmosphere of nitrogen at 60° C. for 12 hours. A solid, clear, glasslike polymeric mass forms in quantitative yield. The product is ground and washed with heptane and dried. The product does not melt at 200° C., nor spontaneously combust at this temperature. In three different tests, four parts of this polymer are ground individually with six parts of ammonium perchlorate, lithium perchlorate, and potassium perchlorate, respectively. In each case, the mixture when ignited, burns very rapidly with an intense white flame and upon testing for thrust properties shows excellent thrust.

*Example III*

Example II is repeated except that an equivalent weight of diallyloxy benzene is substituted for the dinvinyloxy benzene. Similar results are obtained.

*Example IV*

The procedure of Example I is repeated eight times, using in each case 18.2 parts of tri-isobutyl borane, and with each experiment a progressively smaller amount of divinyloxy benzene, as follows: 63, 47, 32, 16, 10.5, 8, 5.3, and 3.9 parts, respectively. In each case a solid product is obtained, as in Example I, but the time required for formation of the cake is progressively decreased as lower amounts of divinyloxy benzene are used. In each case, the product shows excellent thrust properties when burned as such with liquid oxygen in accordance with known tests for propellant thrust.

*Example V*

The procedure of Example I is repeated using 19.6 parts of diallyl ether and 14 parts of tripropyl borane. The resultant product shows excellent thrust upon testing.

When the above procedure is repeated, using an equivalent weight of dimethallyl ether in place of the diallyl ether, similar results are obtained.

*Example VI*

The procedure of Example V is repeated, with similar results, using in place of the diallyl ether an equivalent amount of bis(4-vinyl-cyclohexyl)ether in one case, in another case an equivalent amount of bis(4-allylcyclohexyl)ether in the place of the diallyl (ether), and in a third case an equivalent amount of 1,4-diallyloxy cyclohexane.

*Example VII*

The procedure of Example V is repeated, using an equivalent amount of 4,4'-divinyl-diphenyl oxide in one case, and 4,4'-diallyl diphenyl oxide in another case, in place of the diallyl ether. Similar results are obtained.

*Example VIII*

The following procedure is followed a number of times, using in each case a different mixture selected from those indicated in the table below. The number appearing in the table before a particular compound indicates the number of parts by weight of that compound used. In each case the polyalkenyl ether compound, together with any modifier, is maintained at a temperature of 50° to 55° C. In those cases where the polyalkenyl ether and modifying compounds are gases, they are fed as gas streams to the reaction in an excess of solvent, usually an inert hydrocarbon or an ether. Diborane is fed into the system at such a rate that no more than a 5 degree rise in temperature occurs. When the temperature rises above 60° C., the diborane supply is cut off or reduced until the temperature has subsided to the desired range. All through the reaction an atmosphere of oxygen-free nitrogen is maintained. After 14 parts of diborane have been fed into the system, the diborane supply is cut off and the heating continued until a polymeric reaction product is obtained. In each case when the product is tested for propellant thrust, according to known tests for such purpose, it exhibits excellent thrust properties.

TABLE

| Polyalkenyl Compound | Monoalkenyl Compound | Solvent |
|---|---|---|
| 70 Divinyl ether | | |
| Do | 104 Styrene | |
| 266 1,2 bis(p-vinylphenoxy)-ethane | | {10 Tetrahydrofurane. {90 Heptane. |
| 98 Diallyl ether | 28 Ethylene | {10 Tetrahydrofurane. {90 Heptane. |
| 98 Isopropenyl ether | 42 Propylene | 100 Heptane. |
| 142 1,2-di-(allyloxy) ethane | 56 Butene-1 | {10 B(CH$_2$CH$_2$OC$_2$H$_5$)$_3$ {90 Cyclohexane. |
| 124 Vinyloxy cyclohexene-3 | | |

*Example IX*

A mixture of 10 parts of triethyl borane and 7 parts of divinyl ether is heated under a nitrogen atmosphere at 50° C. for six hours. The mixture is then cooled to room temperature and 10 parts of styrene and 36 parts of finely ground ammonium perchlorate is added and the mixture milled to uniformity and then press-cast in the form of a rod and heated at 60–70° C. for 12 hours. A solid, infusible product is obtained which shows excellent thrust properties.

*Example X*

A mixture of 33 parts of tristyryl borane and 30 parts of p-vinyloxy styrene is heated at 70° C. in a sealed container until a solid, infusible polymer is obtained. This shows excellent thrust properties.

The preceding procedure is repeated using 60 parts of divinyloxy benzene and also 80 parts of ammonium nitrate to produce a solid propellant fuel of excellent thrust.

*Example XI*

A mixture of 10 parts of triethyl borane, and 15 parts of tri(allyloxypropyl)aluminum is heated under an atmosphere of methane for 15 hours at 70° C. An insoluble, infusible product is obtained. This polymer is believed to have at least in part repeating units of the following structure:

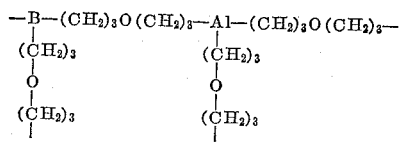

By using equivalent amounts of di(allyloxypropyl)-magnesium and diallyloxypropyl beryllium respectively in place of the tri(allyloxypropyl) aluminum and in each case repeating the preceding procedure, two solid products are obtained which are believed to have repeating units of the following structures:

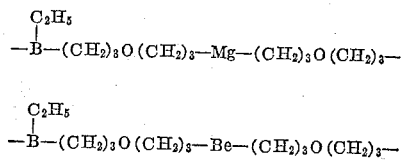

and

Example XII

Ten parts of the polymer of Example I is mixed uniformly with 40 parts of finely divided ammonium perchlorate and a solution of 9 parts of styrene, 1 part of a 50–50 commercial divinyl benzene-ethyl styrene, and 0.1 part of benzoyl peroxide. The mixture is cast and maintained at 70° C. for 12 hours. An insoluble, infusible fuel product is obtained which shows excellent thrust properties.

Example XIII

The procedure of Example II is repeated a number of times with similar results using in each case 5 parts of divinyloxy benzene and, in place of the tri-secondary-butyl borane, an equivalent weight of symmetrical dimethyl diborane
symmetrical diethyl diborane
tetramethyl diborane
tetrapropyl diborane
pentaborane, and
decaborane, respectively The polymerization described herein can be suspended at an early stage to give viscous oils or low melting solid polymers, which can be stored as such and the reaction completed at a subsequent time. In fact, the reaction can be suspended when the product comprises substantially a monomeric product, such as, for example, that derived from a borane and divinyl ether, namely $R_2B-CH_2CH_2OCH=CH_2$, $RB(CH_2CH_2OCH=CH_2)_2$, or $B(CH_2CH_2OCH=CH_2)_3$, and the polymerization completed later with the addition of additional boranes, or other reagents, modifiers, heat, etc.

Various modifiers can be added, either prior to the initiation of the polymerization, at some intermediate stage, or after the polymerization is completed. Such modifiers include various other resins, such as: polystyrene, polyethylene, polypropylene, polybutenes, paraffins, polyvinyl ethers, such as polymeric vinyl ethyl ether, polymeric vinyl butyl ether, etc. Certain other resins containing ester, amide, or other groups that may be reduced or reacted upon by the boranes can be added after the boron polymers are formed. However, if sufficient borane is added to compensate for that used in such side reactions, such resins can also be added before or during the reaction. Such resins include: polyesters, such as polyvinyl acetate, polyvinyl propionate, polyvinyl butyrate, polymethyl methacrylate, polymethyl acrylate, etc., poylvinyl acetal, polyvinyl butyral, etc., polyacrylonitrile, polyamides, such as nylon and polymeric caprolactam, etc Various other polyunsaturated compounds or acetylenic compounds in addition to those indicated above, can also be added either before initiation of the polymerization, at an intermediate stage, or at the completion of the polymerization reaction to modify the properties of the products. With regard to the esters, etc., reactive with boranes, the same comments apply as made above with respect to resins having ester groups, etc. Such polyunsaturated compounds include: polyunsaturated hydrocarbons, polyunsaturated esters, polyunsaturated ether-esters, and various alkenyl aluminum compounds formed by the addition of aluminum alkyls to polyalkenyl hydrocarbon or ether compounds, such as methyl-dibutenyl aluminum, tris(vinyloxyethyl)aluminum, etc., and the corresponding beryllium and magnesium derivatives. Typical examples of such polyunsaturated compounds include, but are not restricted to, the following: 1,3-butadiene, isoprene, 2,3-dimethyl butadiene, pentadiene-1,3, hexadiene-2,4, octadiene-2,4, hexatriene-1,3,5, 2-phenyl-butadiene, 1,3-pentadiene, hexadiene-1,5, 2,4-dimethyl-pentadiene-1,4, vinyl cyclohexene, 1-phenyl-pentadiene-1,3, divinyl cyclohexane, diallyl, 1,6-heptadiene, 1,8-nonadiene, 2,8-decadiene, 2,9-dimethyl-2,8-decadiene, divinyl cyclopentane, divinyl methyl cyclohexane, dipentenyl cyclohexane, allyl cyclohexene, diallyl cyclohexane, divinyl cyclohexene, (beta-vinylalkyl)-furane, (beta-allyl-ethyl)-furane, diallyl cyclohexane, diallyl cyclopentane, dibutenyl cyclohexane, 1,7-diphenyl-heptadiene-1,6, 2,7-diphenyloctadiene-1,7, divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allyl chlorodiphenyl, diallyl benzene, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis - (alpha - ethyl - ethenyl) - benzene, bis-(alpha-vinyl-ethyl)-benzene, bis-(alpha-vinyl-ethyl)-naphthalene, bis-(alpha-vinyl-ethyl)-diphenyl, vinyl (alpha-vinyl-ethyl)-benzene, vinyl (alpha-vinyl-ethyl)-naphthalene, vinyl (alpha-vinyl-ethyl)-diphenyl, dipropenyl benzene, p-propenyl styrene, para - propenyl isopropenyl - benzene, dicrotyl benzene, dicrotyl naphthalene, dicrotyl diphenyl, dicrotyl anisole, dicrotyl xylene, bis-(4-vinyl-n-butyl)-benzene, bis-(5-isopropenyl-n-hexyl)-benzene, bis-(5-isopropenyl-n-hexyl)-diphenyl, bis-(5-methyl-hepten-5-yl)-benzene, bis - (5 - methyl - nonen-6-yl)-diphenyl, bis-(n-decen - 5 - yl)-toluene, dicyclopentenyl-naphthalene, dicyclohexenyl-benzene, acetylene, allene, methyl acetylene, vinyl acetylene, phenyl acetylene, phenylene diacetylene, naphthylene diacetylene, naphthyl acetylene, cyclohexyl acetylene, allyl acrylate, allyl methacrylate, vinyl acrylate, vinyl methacrylate, isopropenyl acrylate, isopropenyl methacrylate, butenyl acrylate, butenyl methacrylate, vinyl crotonate, allyl crotonate, isopropenyl crotonate, propenyl crotonate, isobutenyl crotonate, ethylene glycol diacrylate, trimethylene glycol diacrylate, tetramethylene glycol diacrylate, pentamethylene glycol dimethacrylate, divinyl phthalate, diallyl phthalate, diisopropenyl phthalate, dibutenyl phthalate, divinyl diphenyl-dicarboxylate, diallyl naphthalene-dicarboxylate, diallyl itaconate, divinyl itaconate, divinyl maleate, diallyl maleate, diallyl succinate, diisopropenyl succinate, dibutenyl succinate, divinyl succinate, diallyl adipate, divinyl adipate, diallyl azelate, divinyl azelate, diisopropenyl suberate, divinyl pimelate, diallyl glutarate, diisopropenyl glutarate, divinyl sebacate, diallyl sebacate, diallyl japanate, divinyl octadecanedioate, vinyl 11-acryloxy-undecanoate, allyl 11-methacryloxy undecanoate, isopropenyl 5-crotonoxy-caproate, vinyl 4-acryloxy-caproate, vinyl 11-vinyloxy-undecanoate, allyl 11-allyloxy-undecanoate, vinyl 11-allyloxy-undecanoate, isopropenyl 11-isopropenyloxy-undecanoate, vinyl 5-vinyloxy-caproate, vinyl 5-crotyloxy-caproate, vinyl 5-allyloxy-caproate, allyl 5-allyloxy-caproate, isopropenyl 5-isopropenyloxy-caproate, vinyloxy-tetram ethylene acrylate, allyloxy-hexamethylene methacrylate, allyloxy-octamethylene crotonate, isopropenyloxy-octamethylene acrylate, crotoxy-hexamethylene methacrylate, ethyl diallyl aluminum, propyl dibutenyl aluminum, butyl dibutenyl aluminum, etc.

In addition to the polyalkenyl types of aluminum, beryllium, and magnesium compounds indicated above, it is desirable in some cases to add monoalkenyl aluminum, beryllium, and magnesium compounds and to continue replacement of the remaining hydrogen or saturated hydrocarbon groups on the boron by means of the polyalkenyl compounds or by such compounds which have already partially reacted with boron. By these techniques both boron and aluminum, beryllium, or magnesium, can be incorporated in polymeric materials.

For many purposes, such as fuel, it is desirable to have a high concentration of the boron polymeric units present in the compositions. In such cases, the modifiers are used in minor amounts. However, in certain cases, it may be desirable to use the boron compositions to modify or fortify the properties of other materials, in which case the boron derivatives are used in minor amounts.

As indicated above, the boron polymers of this invention are particularly useful as solid fuels. They can be used as the main fuel component or can be added to various types of other fuels to fortify or supplement such fuels. For example, they can be used as additives to gasoline and other motor fuels, to kerosene and other materials used for turbojet engines, and jet engines, and can be added to liquid and solid propellant fuels used for rockets, missiles, etc. However, these polymeric compositions are particularly useful as the main fuel component in solid propellant fuels used for rockets and related devices. In such latter cases, it is advantageous to convert the fuel to an infusible form. If modifiers, or auxiliary agents, are to be added, this can be effected before conversion to infusibility. Depending on the particular manner in which the fuel is to be used, it can be in solution, powder, rod, cylinder, or whatever other shape is convenient.

While such products should be made and stored under inert atmospheres, it is surprising that considerable amounts of oxidizing agents can be incorporated into these polymeric compositions and can be stored in inert atmospheres without danger of premature ignition or explosion. After the desired amount of oxidizing agent has been incorporated into the polymeric composition, it can be converted to an infusible form by various means including the addition of more boranes or the addition of ether to catalyze further boron-ethylenic addition, the application of moderate heating for similar addition, or effecting crosslinking through the unsaturated groups themselves by heat alone, or by the addition of peroxy, azo, or other free radical-generating catalysts, or by any other means of crosslinking.

Oxidizing agents which can be incorporated in the resin for the ultimate purpose of supporting combustion of the resin and which can be incorporated in accordance with safety conditions determined by their reactivity, include: the solid and liquid perchloryl aryl compounds of the formula Ar—Cl—$O_3$, such as perchloryl benzene, perchloryl toluene, etc., various perchlorates, nitrates, oxides, persulfates, and perborates of metals and ammonia, such as ammonium perchlorate, potassium perchlorate, sodium perchlorate, ammonium nitrate, potassium nitrate, sodium nitrate, potassium permanganate, potassium chlorate, manganese dioxide, potassium iodate, potassium dichromate, chloric acid, perchloric acid, ammonium persulfate, ammonium dichromate, ammonium iodate, aluminum nitrate, barium chlorate, barium perchlorate, barium permanganate, lithium perchlorate, lithium dichromate, lithium permanganate, etc.

Some of these oxidizing agents are not self-sustaining oxidizing agents, and can be used when free oxygen, or compositions such as perchloryl fluoride, highly concentrated hydrogen peroxide, etc., which generate oxygen in situ, are passed in surface contact with the fuel. The liquid oxidizing agents can be incorporated with precautions to assure uniform distribution through the polymer mass and to avoid ignition or explosive conditions during preparation and use of the fuel. It is desirable that the products from reaction of the oxidizing agent and the resin are gaseous in their normal state so that the energy developed in the system will not be robbed of energy to convert them to the gaseous state.

It is generally desirable that the fuel be molded in the shape in which it is ultimately to be used before the composition is converted to an infusible state. In fact, the fuel can even be cast or molded as one entire unit which will comprise the entire fuel load for one rocket and can be substantially as long as the rocket if desired. Therefore, the size is limited only by the size of the rocket in which it is to be used.

It is possible to make the fuel in other shapes than indicated above and have the fuel machined to give the desired shape. For example, cylindrical shapes are generally desirable with an opening running through the cylinder along its linear axis. If desired, there can be a plurality of such openings running through the length of the mass so that more than one oxidizing stream can function simultaneously. However, various other shapes can be used, such as blocks having rectangular or square cross sections with one or more openings running along the linear axis of the block.

While the aforementioned shapes are preferred, it is also possible to use smaller units or shapes made by the practice of this invention, and then to assemble them in a space or container advantageously in such a manner that one or more open linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. A cylindrical mass can be made of a number of concentric cylinders for which the outer diameter of one is slightly less than the diameter of the inside linear opening of another so that the assembled cylindrical mass actually comprises a number of cylindrical sleeves which fit over one another. The axial opening of the one having the smallest diameter would be the linear axis opening of the assembled mass.

In addition to the foregoing, the resin-oxidizing agent composition can be made in various other shapes, depending on the manner in which it is ultimately to be used. As a further example, it can be shaped as a solid rod, in which case the burning surface will be the outer surface of the rod or cylinder. The outer surface of the rod can be ignited and if a supplementary oxidizing fluid is used, this can be directed against such outer surface of the rod. If desired, the rod can be advanced through an opening in accordance with the desired rate at which the surface is to be exposed to a supplementary oxidizing fluid. The composition can also be shaped in the form of granules, pellets, etc., where it is desired to modify the surface area that is to be exposed for combustion. Such granules can be used as such, or can be adhered to metal surfaces in accordance with the present known art in the use of solid propellant fuel in granular form.

When the oxidizing agent to be added is a solid, it is desirably in fine particle size so as to permit substantially uniform distribution throughout the mass. The oxidizing composition which is to be passed in surface contact with the fuel is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used, the type of fuel base material used together with its heat capacity and heat transmission properties, the temperature which will exist in the preparation and use of the fuel, etc.

Since the fuel composition of this invention can be used according to various methods, varying from the use of a substantial amount of supplemental oxidizing fluid to that in which the combustion is self-sustained by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen that is liberated for oxidizing purposes upon decomposition of the oxidizing agent. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of B.t.u. content, then it may be desirable to use a smaller amount of oxidizing agent.

The amount of oxidizing agent imbedded in the fuel itself can be further decreased when a supplemental oxidizing fluid is being pumped into contact with the fuel. Obviously, therefore, the proportion of oxidizing agent imbedded in the fuel base material can vary from 5 percent to approximately 95 percent depending on the various factors involved, such as the efficiency desired, the method and convenience of operation, and the materials being used. Generally, when an oxidizing agent is imbedded in the base material, it is advantageous to use from about 5 percent to 95 percent, preferably about 20 percent to about 75 percent based on the combined weight of oxidizing agent, base material, and any crosslinking modifier that is used.

When an oxidizing agent is used in the fuel base material of the type and in the amount that will be self-sustaining in the combustion of the fuel base material, there will be no need to use an oxidizing fluid on the surface of the fuel. In such cases, the combustion of the fuel is initiated by igniting it by various means presently used for that purpose, such as a mixture of hydrazine, or unsymmetrical dimethyl hydrazine, and nitric acid, or by triethyl aluminum and oxygen, or by a torch, or by an electrical ignition system. When the oxidizing agent is not present in self-sustaining amount, liquid oxygen or an efficient oxidizing compound such as perchloryl fluoride ($FClO_3$) can be pumped into contact with the surface of the fuel to supply the oxygen for combustion. In some cases highly concentrated hydrogen peroxide, such as 98 percent hydrogen peroxide can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting, where less than 100 percent efficiency is satisfactory, or adding, where desired, an excess to compensate for the lack of 100 percent efficiency in the actual combustion. Since the conditions of operation do not permit the time and type of mixing which give 100 percent efficiency, where other factors permit, it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount or even less than that amount of the oxidizing agent can be used, depending on the fuel efficiency desired.

The oxidizing agent and/or modifier can be introduced or suspended in the solid fuel in any convenient or appropriate manner. The mixture can be effected mechanically as on mixing mills, on a Banbury mixer, any single or double worm extruder, or by rotation of the mold when the material is being cast from a liquid state. When a solid is to be added, the thermoplastic material can desirably be softened by the addition of a softening agent, or, as indicated above, by the modifier itself. Such compounded mixtures can then be extruded, or otherwise shaped into the desired form and then polymerized to infusibility. In some cases, depending on the particle size of the solid oxidizing agent and the amount of void space between particles, the polymer in liquid state, or the monomer from which it is to be prepared, together with a polymerization catalyst of the peroxy or azo type, can be poured into a container holding the solid oxidizing agent and thereby fill the void spaces. Then upon standing at room temperature, or at slightly raised temperatures, the polymer or monomer will be converted to an infusible state with the oxidizing agent embedded therein.

However, whichever method of mixing is used, it is desirable to avoid the generation of heat that will raise the temperature to the ignition point of the oxidizing agent. Therefore, in some cases, it is desirable to precool the materials to be mixed or to provide means to withdraw the heat as it is generated.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A process for the preparation of a polymeric composition comprising the step of reacting a composition consisting essentially of at least one alkenyl ether compound having only hydrocarbon and ether groups therein, having a molecular weight of no more than about 300, having at least two ethylenically unsaturated groups therein and having an ether linkage between each two said ethylenic groups, with at least one boron compound selected from the class consisting of boron hydrides and the hydrocarbon-substituted derivatives thereof, whereby substantially each polymer molecule resulting from said reaction contains as repeating units therein at least two molecules of said boron compound.

2. A process of claim 1, in which said reacting composition also contains a monoalkenyl compound selected from the class consisting of monoalkenyl hydrocarbons and monoalkenyl ethers.

3. A process of claim 1, in which said reacting composition also contains a monoalkenyl hydrocarbon.

4. A process of claim 3, in which said reacting composition also contains a monoalkenyl ether.

5. A process of claim 4, in which said monoalkenyl ether is a vinyl ether.

6. A process of claim 1, in which said boron compound is a polyborane.

7. A process of claim 1, in which at least one of said ethylenic groups is a vinyl group.

8. A process of claim 1, in which said compound is divinyl ether.

9. A process of claim 1, in which at least one of said ethylenic groups is a vinylidene group.

10. A process of claim 1, in which all of said ethylenic groups are vinyl groups.

11. A process of claim 1, in which all of said ethylenic groups are vinylidene groups.

12. A process for the preparation of a polymeric composition comprising the step of reacting diborane with a composition consisting essentially of at least one alkenyl ether compound having only hydrocarbon and ether groups therein, having a molecular weight of no more than about 300, having a plurality of ethylenically unsaturated groups therein and having an ether linkage between each two said ethylenic groups whereby polymer molecules resulting from said reaction contain a plurality of boron atoms therein.

13. A process for the preparation of a polymeric composition comprising the step of reacting an alkyl-substituted borane with a composition consisting essentially of at least one alkenyl ether compound having only hydrocarbon and ether groups therein, having a molecular weight of no more than about 300, having a plurality of ethylenically unsaturated groups therein and having an ether linkage between each two said ethylenic groups whereby polymer molecules resulting from said reaction contain a plurality of boron atoms therein.

References Cited in the file of this patent

UNITED STATES PATENTS

| | | |
|---|---|---|
| 2,633,460 | Neher et al. | Mar. 31, 1953 |
| 2,857,258 | Thomas | Oct. 21, 1958 |
| 2,927,914 | Hosmer et al. | Mar. 8, 1960 |
| 2,949,352 | Cramer | Aug. 14, 1960 |
| 2,977,391 | Pearl | Mar. 28, 1961 |
| 3,062,856 | D'Alelio | Nov. 6, 1962 |

OTHER REFERENCES

Hurd: Chemistry of the Hydrides, John Wiley & Sons, Inc. New York 1952, pp. 74 to 75.

Stone et al.: Chemical Society Journal (London), 1950, pp. 2755–9.